United States Patent
Engineer et al.

(10) Patent No.: US 9,574,517 B2
(45) Date of Patent: Feb. 21, 2017

(54) THERMOELECTRIC GENERATOR INSERT FOR ENGINE WASTE HEAT RECOVERY

(71) Applicants: Hyundai America Technical Center, Inc., Superior Township, MI (US); Hyundai Motor Company, Seoul (KR); Kia Motors Corporation, Seoul (KR)

(72) Inventors: Nayan Engineer, Canton, MI (US); Lang Sui, Ann Arbor, MI (US)

(73) Assignees: Hyundai America Technical Center, Inc, Superior Township, MI (US); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 74 days.

(21) Appl. No.: 14/077,795

(22) Filed: Nov. 12, 2013

(65) Prior Publication Data
US 2015/0128590 A1      May 14, 2015

(51) Int. Cl.
| | |
|---|---|
| *F02G 3/00* | (2006.01) |
| *H01L 35/00* | (2006.01) |
| *F02G 5/02* | (2006.01) |

(52) U.S. Cl.
CPC ............... *F02G 5/02* (2013.01); *Y02T 10/166* (2013.01)

(58) Field of Classification Search
CPC ............ F02B 37/00; F01L 35/32; F01L 35/30; F01L 35/02; F01L 35/00; F02G 5/02
(Continued)

(56) References Cited

U.S. PATENT DOCUMENTS 3,636,934 A * 1/1972 Nakajima ............... F02D 21/08
                                                                   123/568.19
6,166,317 A * 12/2000 Volk, Jr. ..................... 136/201
(Continued)

FOREIGN PATENT DOCUMENTS

DE    102011013622 A1 *  9/2012  ............. H02N 11/00
JP        60113677 A  *  6/1985  ............. H02N 11/00
(Continued)

OTHER PUBLICATIONS

Z. Aksamija and I. Knezevic, "Thermoelectric properties of silicon structures", Journal of Computational Electronics, 9, 173-179 (2010).*

(Continued)

*Primary Examiner* — Nicholas J Weiss
*Assistant Examiner* — Ngoc T Nguyen
(74) *Attorney, Agent, or Firm* — Mintz Levin Cohn Ferris Glovsky and Popeo, P.C.; Peter F. Corless

(57) ABSTRACT

According to the disclosed embodiments, a thermoelectric generator (TEG) insert is used for recovery of engine waste heat. The embodiments include an engine having an exhaust manifold outlet, and an exhaust pipe having an inlet and an outlet. The TEG insert, which is configured to convert heat from exhaust gas leaving the engine into electrical power, may be disposed between the exhaust manifold outlet of the engine and the inlet of the exhaust pipe. The location of the TEG insert may maximize the thermal conversion of heat to electricity. Further, the size of the TEG insert may be minimized through the use of a high-efficiency nano-material. As a result, overall fuel economy may be maximized, the size of ancillary components, e.g., alternator, coolant pump, oil pump, etc., may be reduced, and minimal engine design change may be required to accommodate the TEG insert described herein.

15 Claims, 3 Drawing Sheets

(58) Field of Classification Search
    USPC .......................................................... 60/605.1
    See application file for complete search history.

(56) References Cited

U.S. PATENT DOCUMENTS

| | | | |
|---|---|---|---|
| 2010/0269878 A1* | 10/2010 | Kuhlbach | 136/201 |
| 2011/0067742 A1* | 3/2011 | Bell et al. | 136/204 |
| 2011/0146743 A1* | 6/2011 | Oesterle et al. | 136/210 |
| 2012/0204557 A1* | 8/2012 | Jebasinski et al. | 60/605.1 |
| 2013/0002091 A1* | 1/2013 | Kim et al. | 310/306 |
| 2013/0152562 A1* | 6/2013 | An et al. | 136/208 |
| 2013/0283764 A1* | 10/2013 | Schmidt | F01N 5/02 60/272 |
| 2014/0150840 A1* | 6/2014 | Vitek et al. | 136/210 |

FOREIGN PATENT DOCUMENTS

| | | |
|---|---|---|
| JP | 2000-018095 | 1/2000 |
| JP | 2005299417 A | 10/2005 |
| JP | 2006-083707 A | 3/2006 |
| JP | 2012-167671 A | 9/2012 |
| KR | 10-0386472 | 6/2003 |

OTHER PUBLICATIONS

Bux et al., "Nanostructured Bulk Silicon as an Effective Thermoelectric Material", Advanced Functional Materials, 19, 2445-2452 (2009).*

* cited by examiner

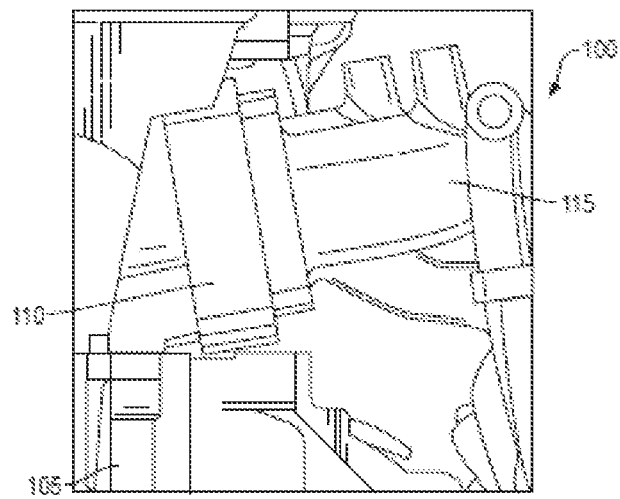
FIG. 1C
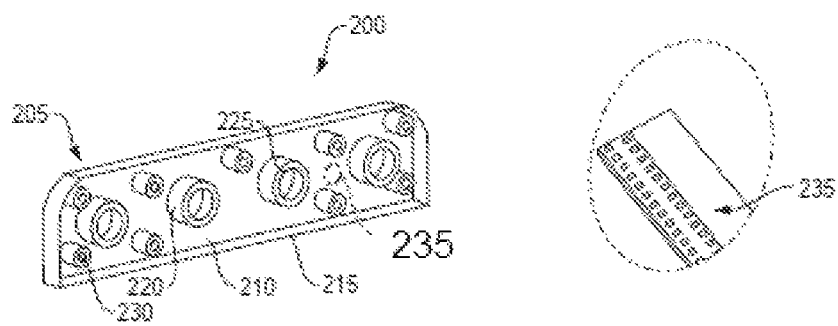 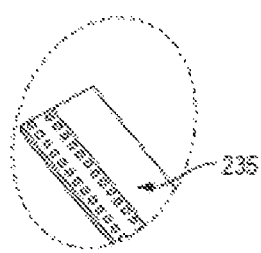
FIG. 2A　　　　　FIG. 2B

US 9,574,517 B2

THERMOELECTRIC GENERATOR INSERT FOR ENGINE WASTE HEAT RECOVERY

TECHNICAL FIELD

The present disclosure relates generally to motor vehicles, and, more particularly, to a thermoelectric generator insert for recovery of engine waste heat in motor vehicles.

BACKGROUND

Thermoelectric generators (TEGs) are devices that are capable of converting heat into electrical energy. TEGs can be employed to improve operational efficiency of a myriad of applications. One such application is automobiles, where TEGs may be utilized to recover usable energy from automobile waste heat. More specifically, a TEG may convert waste heat, e.g., exhaust heat, in an internal combustion engine (IC) into electricity. This electricity may then be utilized by other components within the automobile, which can increase the overall fuel economy and improve vehicle emissions, e.g., a charge for a battery, electrical components, etc.

Current automobile TEGs, however, suffer from drawbacks which can hinder the device's potential usefulness. For example, current automobile TEGs are typically located far from the engine and the coolant circulation path and are typically relatively large in size. As a result, the maximum amount of heat applied to the device decreases as it gets further from the engine block. Additionally, since these devices are large in size, they are also quite heavy and require a significant cooling system to be routed to them. This added weight can cause the engine to work harder, thus resulting in lower gas mileage.

Moreover, current automobile TEGs are typically complex in their assembly and are difficult to remove. As a result, modifying the engine design may be necessary to accommodate the TEG, and repairing and/or replacing the TEG can be expensive and time-consuming. Therefore, there is currently a need for a TEG which is highly efficient, yet has a minimal size and weight, is easily removable, and has an assembly of minimal complexity.

SUMMARY

According to the disclosed embodiments, a TEG insert is used for recovery of engine waste heat. The embodiments include an engine having an exhaust manifold outlet, and an exhaust pipe having an inlet and an outlet. The TEG insert, which is configured to convert heat from exhaust gas leaving the engine into electrical power, may be disposed between the exhaust manifold outlet of the engine and the inlet of the exhaust pipe. The location of the TEG insert may maximize the thermal conversion of heat to electricity. Further, the size of the TEG insert may be minimized through the use of a high-efficiency nano-material. As a result, overall fuel economy may be maximized, the size of ancillary components, e.g., alternator, coolant pump, oil pump, etc., may be reduced, and minimal engine design change may be required to accommodate the TEG insert described herein.

BRIEF DESCRIPTION OF THE DRAWINGS

The foregoing and other objects, features, aspects and advantages of the embodiments disclosed herein will become more apparent from the following detailed description when taken in conjunction with the following accompanying drawings.

FIGS. 1A-1C illustrate an exemplary assembly of a vehicle engine and exhaust manifold in conjunction with a TEG insert.

FIGS. 2A-B illustrate an exemplary cross-sectional side view of the TEG insert.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle," "vehicular," "automobile," or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). Along the same lines, the term "passenger" or "vehicle passenger" refers to any person located inside a vehicle, including, for example, a driver, a rider in the front passenger seat or backseat, etc.

Figure 1A:
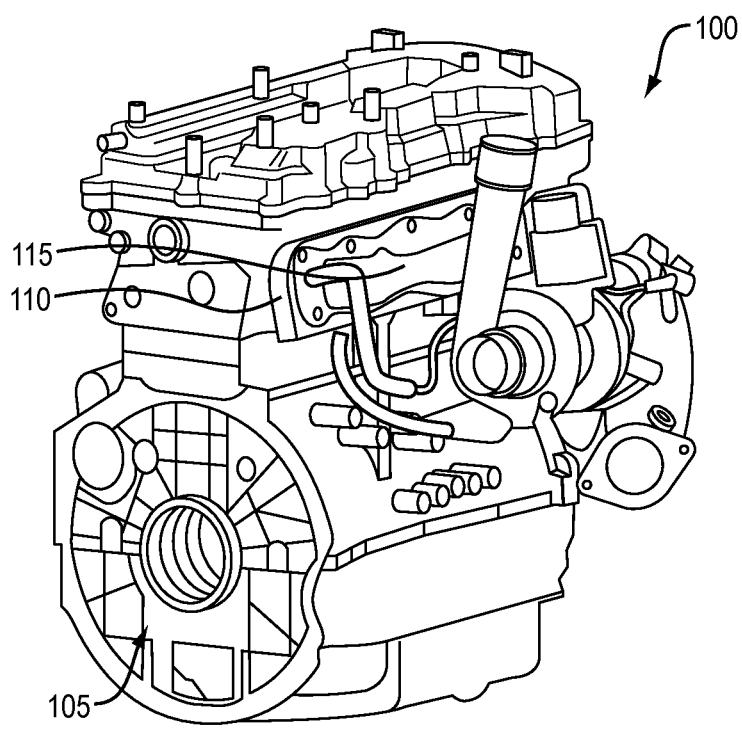
Figure 1B:
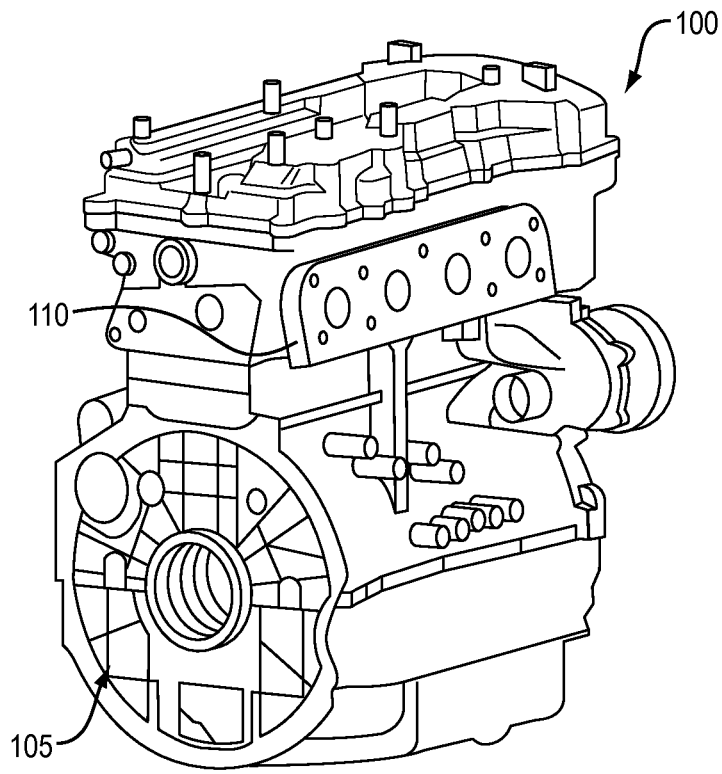

FIGS. 1A-1C illustrate an exemplary assembly of a vehicle engine and exhaust manifold in conjunction with a TEG insert. As shown in FIG. 1A, the engine-TEG insert assembly 100 includes an engine 105, TEG insert 110, and exhaust manifold 115. As shown in FIG. 1B, the engine-TEG insert assembly 100 includes the engine 105 and TEG insert 110, with the exhaust manifold 115 removed from the assembly for illustration purposes. As shown in FIG. 1C, a side view of the engine-TEG insert assembly 100 is depicted, whereby the engine-TEG insert assembly 100 includes the engine 105, TEG insert 110, and exhaust manifold 115.

The engine 105 may be used, for example, to provide power to a vehicle by converting energy into mechanical motion. The engine 105 may be of any type suitable for powering a vehicle and coupling to an exhaust manifold, including, for example, an internal combustion engine. The engine 105 may include an exhaust manifold outlet suitable for coupling to an exhaust manifold, such as the exhaust manifold 115.

The exhaust manifold 115, e.g., "header," may be used to collect exhaust gas released by the engine 105, e.g., when an engine exhaust valve is opened. In particular, the exhaust manifold 115 may include multiple cylinders that are configured to receive exhaust gas from multiple outlets of engine 115. The multiple cylinders typically merge into a single pipe, e.g., exhaust pipe, and the exhaust gas is eventually released by the exhaust pipe into the atmosphere. As would be understood by one of ordinary skill in the art, the exhaust gas may pass through various other components, e.g., catalytic converter, muffler, etc., prior to being released into the atmosphere.

In some vehicles, heat generated by exhaust gas leaving the engine is captured by a thermoelectric generator (TEG) and converted into electrical power. Operationally, the TEG typically includes TEG elements/panels. A temperature gradient may be generated across the TEG panels from coolant and hot exhaust gas flowing through the manifold. This gradient creates an electric current which can be utilized by various ancillary components, thereby increasing operational efficiency, e.g., by reducing the size of the alternator/coolant pump/oil pump/etc., and increasing fuel economy. Without a TEG, the heat generated by exhaust gas leaving the engine may simply be wasted.

As noted above, typical TEGs suffer from being large in size and weight, and thus are located distant from the engine. As a result, the weight of vehicle may be significantly increased, since coolant must be pumped further away from engine. The added weight can cause the engine to work harder, thus resulting in lower gas mileage.

However, as shown in FIGS. 1A-1C, a TEG insert 110 may be disposed between the engine 105 and the exhaust manifold 115. More particularly, the TEG insert 110 may be disposed between the exhaust manifold outlet of the engine 105 and the inlet of the exhaust pipe. The TEG insert 110 may be of a constant width W, as shown in FIG. 1C. The width (W) of the TEG insert may be in a range of 0.2 mm to 10 mm, and preferably a range of 0.5 mm to 1 mm. Moreover, the length of the TEG insert may be in a range of 0.5 mm to 50 mm, and preferably a range of 1 mm to 10 mm. Thus, a contact area of the TEG insert may preferably be in an approximate range of 0.5 mm$^2$ to 10 mm$^2$. Advantageously, due to its compact size, the TEG insert 110 may be located in the hottest region of the engine, i.e., substantially adjacent to the engine and the exhaust manifold outlet, for maximum energy conversion. Thus, the TEG insert 110 may be directly heated by the hot exhaust gas leaving the engine 105.

As discussed in further detail below, the TEG insert 110 may include a housing that is substantially enclosed, and TEG elements that are mounted on an interior portion of the housing. The TEG elements may be made of a highly efficiency silicon-based nanostructure, which allows for the size of the TEG elements to be greatly reduced, and thus the packing fraction to be increased. Using the silicon-based nanostructure, each of the TEG elements may be approximately 1 mm$^2$ in size, allowing for thousands of elements on a relatively small surface area. Accordingly, a greater number of TEG elements may fit into a smaller compartment, thereby reducing the overall size of the TEG insert.

Moreover, the TEG insert 110 may be designed such that it is removably attached to the engine. For example, the TEG insert 110 may be attached to the engine 105 and exhaust manifold 115 using fastening members, e.g., bolts. As a result, the TEG insert 110 may be easily added to an engine without requiring substantial changes to the current design. Also, the TEG insert 110 can be readily removed for servicing or replacement, thereby producing significant cost benefits.

FIGS. 2A-B illustrate an exemplary cross-sectional side view of the TEG insert. As shown in FIG. 2A, the TEG insert 200 may include a housing 205 that encompasses at least a sidewall 210, an outside wall 215, an extension wall 220, a cut-out portion 225, and a fastening portion 230. TEG elements 235 (in FIG. 2B which is an exploded view of FIG. 2A) may be mounted on the interior of the housing 205, as described in further detail below. The function and configuration of the TEG insert 200 illustrated in FIGS. 2A-B may be equivalent to that of the TEG insert illustrated in FIG. 1.

The TEG insert 200 may include a housing 205 that substantially encloses the TEG insert 200. Being substantially enclosed, the housing 205 may act as a compartment for one or more TEG elements 235. The housing 205 may be substantially enclosed by the sidewall 210, e.g., "first sidewall," and second sidewall (shown as 325 in FIG. 3), in conjunction with the outside wall 215. The first sidewall 210 and second sidewall may face each other and extend in a direction substantially parallel to one another. The outside wall 215 may connect a perimeter of the first sidewall 210 to a perimeter of the second sidewall. The outside wall 215 may be of a constant width, thus causing the TEG insert 200 to also be of a constant width. The TEG insert 200, as illustrated in FIG. 2, and more particularly the housing 205, has an elongated shape. However, the TEG insert 200 may assume any dimensions which are suitable for disposition between the engine 105 and exhaust manifold 115, such that the TEG insert may be directly heated by the hot exhaust gas leaving the engine.

The housing 205 may include an interior portion with a hollow chamber. In particular, the perimeters of the first and second sidewalls may be connected by the outside wall 215, such that the interior portion of the housing 205 forms a hollow chamber. The hollow chamber may be useful for allowing air and/or a fluid, e.g., coolant, to traverse the interior portion of the housing 205. The coolant traversing the interior portion of the housing 205 may act to cool the TEG elements 235 mounted thereon, as discussed in further detail below. (See FIG. 2B)

The housing 205 may further include at least one extension wall 220. For the purposes of the present disclosure, the term "extension wall" may encompass a single extension wall, or multiple extension walls. The extension wall 220 may traverse the interior portion of the housing 205 so as to connect the first sidewall 210 to the second sidewall. The extension wall 220 may also extend in a direction substantially orthogonal to the first and second sidewall. The surface of the extension wall 220 may come into contact with coolant traversing the interior portion of the housing 205; however, the extension wall should not entirely impede the flow of the coolant.

The extension wall 220 may be formed by a cut-out portion 225 in the housing 205. The cut-out portion 225 may traverses a width of the housing 205, whereby the width of the housing is determined by the width of the outside wall 215. The TEG insert 200 may be positioned adjacent to the engine 105, such that the cut-out portion 225 is operable to receive the exhaust gas leaving the engine. More specifically, the TEG insert 200 may be fitted to the engine, such that the perimeter of the cut-out portion 225 is coupled to the exhaust manifold outlet of the engine. As a result, that exhaust gas leaving the engine may traverse the length of the cut-out portion 225, i.e., in a transverse direction of the housing 205, and the exhaust gas may heat TEG elements 235 mounted on the interior of the housing 205. The TEG insert 200 may further be fitted to the exhaust manifold 115, which is located on an opposite side of the TEG insert as the engine 105, such that the perimeter of the cut-out portion 225 is coupled to the exhaust manifold/pipe inlet. The cut-out portion 225, as illustrated in FIG. 2, has a circular shape; however, any shape suitable for fitting the TEG insert 200 to the exhaust manifold outlet of the engine and the exhaust manifold inlet may be utilized.

The housing 205 may further include at least one fastening portion 230. For the purposes of the present disclosure, the term "fastening portion" may encompass a single fastening portion, or multiple fastening portion. The fastening portion 230 may be operable to removably attach the TEG insert 200 to the engine 105 and/or the exhaust manifold 115. The fastening portion 230 may receive a fastening member, including, for example, a bolt. The fastening member may attach the housing 205 of the TEG insert to the engine 105 and/or the exhaust manifold 115. Preferably, the fastening member may be easily removed from the TEG insert 200, engine 105, and/or exhaust manifold 115, thereby allowing for easy removal of the TEG insert for servicing or replacement.

As can be seen from FIG. 2B, TEG elements 235 may be mounted on an interior portion of the housing 205. More specifically, the TEG elements 235 may be mounted on the interior walls of the housing 205, e.g., the interior surfaces of the sidewall 210, the outside wall 215, and/or the extension wall 220. The TEG elements 235 may be mounted only on the interior surface of the first sidewall 210, only on the interior surface of the second sidewall (shown in FIG. 3), or both. Notably, as the number of TEG elements 235 that are mounted on the interior walls of the TEG insert 200 increases, the power output also increases.

As would be understood by one of ordinary skill in the art, TEGs convert heat into electric energy, i.e., electricity. More specifically, the temperature difference between two surfaces/ends of a TEG module generates electricity. Heating one end of a TEG causes electrons to move away from the hot end toward the cold end, thereby causing an electrical current. The temperature difference in a TEG module employed in a vehicle is often due to exhaust heat and coolant. During operation of typical vehicles, the difference in temperature of the exhaust and temperature of the coolant is up to 400° C. The temperature difference is proportionally related to the power output of the TEG elements. In other words, a large temperature difference across the TEG results in a large power output. Thus, positioning the TEG insert 200 directly adjacent to the engine, in accordance with the disclosed embodiments, is advantageous because the TEG insert is located at an area where the temperature of the exhaust gas reaches a maximum level.

The TEG elements 235 may be made of a silicon-based nanostructure, or alternatively, composed of other suitable materials, such as, for example, bismuth, lead, magnesium, selenium, tellurium, germanium, antimony, nichrome, and the like. The silicon-based nanostructure is a highly efficient TEG-adaptable material, which allows for the size of the TEG elements to be significantly reduced. A single TEG pair may consist of one n-type and one p-type nanostructure, or alternatively, one n-type nanostructure or one p-type nanostructure. Each TEG element 235 may be grouped together in arrays/panels. Each array may contains hundreds of semiconducting nanostructure TEG elements. Each individual TEG element may be approximately 1 mm$^2$ in size. Moreover, the TEG elements 235 may be encased in a protective jacket for added protection.

As noted above, the TEG insert 200 should be sufficiently compact so as to reduce weight added to the vehicle, thereby improving overall fuel economy. Notably, a large interior surface area to TEG element size ratio—a result of the nanostructure composition of the TEG elements—allows for a high number of TEG elements 235 to be mounted inside the TEG insert 200. For example, in the interest of minimizing size and weight of the TEG insert, while maximizing the TEG efficiency, it is contemplated that the total interior surface area of the housing 205 is in a range of 20,000 mm$^2$ to 150,000 mm$^2$, and preferably a range of 50,000 mm$^2$ to 120,000 mm$^2$, and more preferably a range of 80,000 mm$^2$ to 90,000 mm$^2$. According to the exemplary dimensions specified above, the total interior surface area of the sidewall 210, e.g., "first sidewall," and the second sidewall may be in the range of 10,000 mm$^2$ to 75,000 mm$^2$; the total interior surface area of the outside wall 215 (excluding inlet/outlet openings) may be in the range of 5,000 mm$^2$ to 40,000 mm$^2$; and the total interior surface area of the extension wall 220 may be in the range of 5,000 mm$^2$ to 40,000 mm$^2$. Importantly, the surface area dimensions described above are intended for illustration purposes and for providing a better understanding of the present disclosure only, and should not be understood as limiting the disclosed embodiments.

Figure 3:
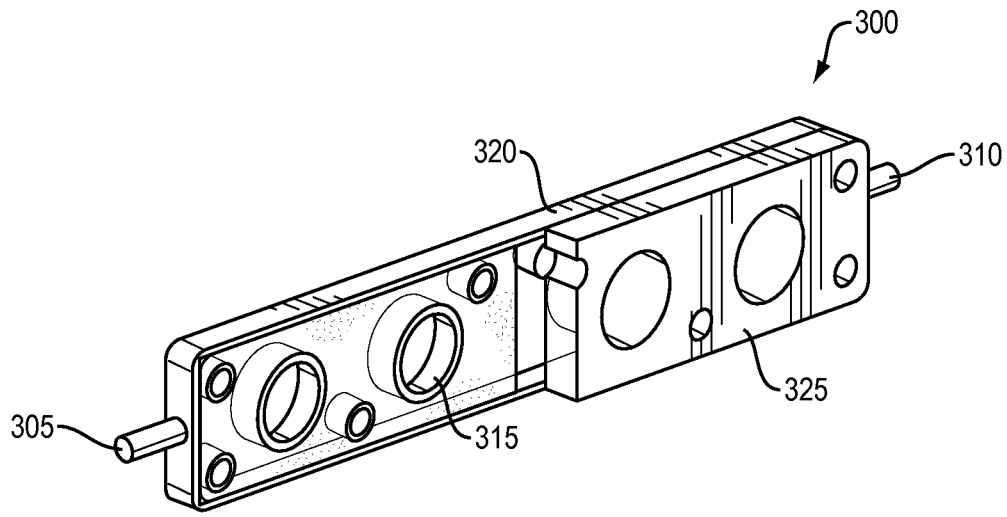
FIG. 3 illustrates an exemplary partial cross-sectional side view of the TEG insert with coolant traversing a hollow interior chamber.

FIG. 3 illustrates an exemplary partial cross-sectional side view of the TEG insert with coolant traversing a hollow interior chamber. As shown in FIG. 3, TEG insert 300 includes an inlet 305 and an outlet 310 disposed on the housing 320. The partial cross-sectional side view further illustrates the second sidewall 325, which opposes the first sidewall 210, as shown in FIG. 2A. The function and configuration of the TEG insert 300 illustrated in FIG. 3 may be equivalent to that of the TEG insert(s) illustrated in FIGS. 1 and 2.

The TEG insert 300 may include an inlet 305 and an outlet 310 that are formed on the housing 320. The inlet 305 and outlet 310 may respectively be disposed on opposite ends of the housing 320. As noted above, the interior portion of the housing 320 may include a hollow chamber. Thus, the inlet 305 and outlet 310 may be configured to allow coolant to pass through the hollow chamber traversing the exhaust passages 315. The inlet 305 and outlet 310 may be configured to fit a coolant hose/tube (not shown), for example.

As noted above, the TEG elements mounted on the interior walls of the TEG insert 300 may be heated by the exhaust gas leaving the engine. At the same time, as the coolant traverses the hollow interior portion of the housing 320, the coolant may cool the TEG elements, e.g., dissipate heat generated from the exhaust gas. Consequently, a temperature difference may be created on opposing ends of the TEG elements, which the TEG uses to generate electrical power, as described above.

Figure 4:
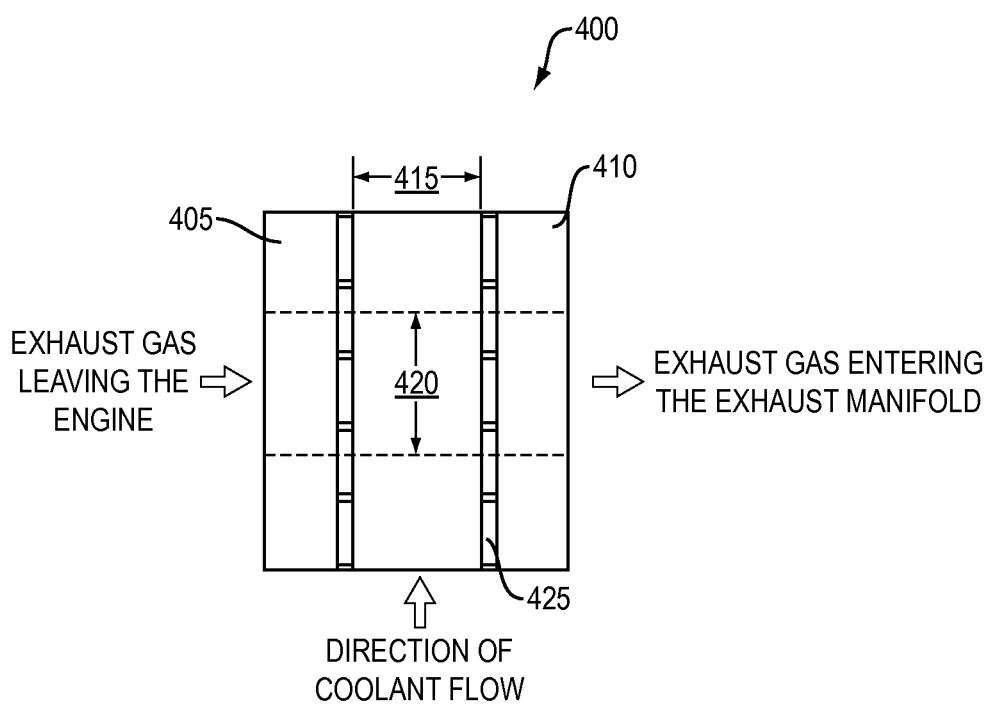
FIG. 4 illustrates an exemplary cross-sectional diagrammatic top view of the TEG insert depicting an exhaust gas flow direction and a coolant flow direction.

FIG. 4 illustrates an exemplary cross-sectional diagrammatic top view of the TEG insert depicting an exhaust gas flow direction and a coolant flow direction. As shown in FIG. 4, the TEG insert 400 includes an engine-side wall 405, an exhaust manifold-side wall 410, and an interior portion 415 in-between. The TEG insert may further include a cut-out portion 420 and at least one TEG element 425. The function and configuration of the TEG insert 400 illustrated in FIG. 4 may be equivalent to that of the TEG insert(s) illustrated in FIGS. 1-3.

The engine-side wall 405 and the exhaust manifold-side wall 410 may be equivalent to the first sidewall and second sidewall, respectively, as described above. Sandwiched between the engine-side wall 405 and the exhaust manifold-side wall 410 may be an interior portion 415. The interior portion 415 may include a hollow chamber configured to allow coolant to pass through the interior of the TEG insert 400. The interior portion 415 may be coupled to an inlet and an outlet, as shown in FIG. 3. The coolant may be pumped through the TEG insert 400 from an upstream coolant pump, for example.

As noted above, the cut-out portion 420 may traverse a width of the TEG insert 400. As such, the cut-out portion 420 may also traverse the width of the engine-side wall 405 and the exhaust manifold-side wall 410. As further noted above, the TEG insert 400 may be positioned adjacent to the engine such that the cut-out portion 420 is operable to receive the exhaust gas leaving the engine. As shown in FIG. 4, exhaust gas leaving the engine may flow through the cut-out portion 420 in a width direction of the TEG insert 400, i.e., transverse to the direction in which the TEG insert longitudinally extends. The exhaust gas leaving the engine creates heat, which may heat the TEG elements 425. Moreover, due to the positioning of the TEG elements 425 within the TEG insert 400, the TEG elements may be heated more on a first side of the TEG elements, e.g., an engine-side, than on a second side of the TEG elements, e.g., an exhaust manifold-side—although the engine is not necessarily warmer than the manifold. Notably, after the exhaust gas is released by the engine, heat dissipates from the exhaust gas over time. Thus, due to the positioning of the TEG insert 400, the engine-side wall 405 may receive more heat than the exhaust manifold-side wall 410, as the exhaust gas may have cooled slightly after reaching the exhaust manifold-side wall.

Notably, the TEG insert wall, i.e., the engine-side wall 405, may be in direct contact with the exhaust gas; however, the TEG elements 425 themselves may not be in direct contact with the exhaust gas. Instead, the TEG elements may be in contact only with the TEG insert wall and/or protective jacket surrounding the TEG elements. Thus, the exhaust gas may indirectly heat the TEG elements 425, i.e., without direct contact.

At the same time, coolant may traverse the interior portion 415 of the TEG insert 400. As shown in FIG. 4, the coolant may flow through the interior portion 415 in a length-wise direction of the TEG insert 400, i.e., parallel to the direction in which the TEG insert longitudinally extends. The coolant path may be continuous across the surface of the TEG elements 425, and the flowing coolant may cool the TEG elements as a result. Thus, because a first side of the TEG elements 425 may be directly heated by the exhaust gas leaving the engine, and the second side of the TEG elements may be cooled by the coolant, a temperature difference across the TEG elements may be generated. The TEG elements 425 may then utilize the temperature difference to convert the wasted exhaust heat into electricity.

As described above, the TEG elements 425 may be mounted only on the interior surface of the engine-side wall 405, only on the interior surface of the exhaust manifold-side wall 410, or both. In the case where TEG elements 425 are mounted on the engine-side wall 405 and the exhaust manifold-side wall 410, the coolant may cool the TEG elements on both sides. Additional TEG elements 425 may also be mounted on the interior surface of the outside wall and/or the extension wall(s), as shown in FIG. 2. Of course, as the number of TEG elements 425 that are mounted on the interior surface of the TEG insert 400 increases, the power output may also increase.

The components, arrangements, and techniques described herein, therefore, provide for recovering engine waste heat using a TEG insert. As noted above, due to its compact size, the TEG insert may be located in the hottest region of the engine, i.e., substantially adjacent to the engine and the exhaust manifold outlet, for maximum energy conversion. Thus, the TEG insert may be directly heated by the hot exhaust gas leaving the engine. Moreover, because the TEG elements may be mounted in a single TEG insert, and the TEG insert may be removably attached to the engine and/or exhaust manifold, the TEG insert can be readily removed for servicing or replacement, thereby producing significant cost benefits.

While there have been shown and described illustrative embodiments that provide for recovering engine waste heat using a TEG insert, it is to be understood that various other adaptations and modifications may be made within the spirit and scope of the embodiments herein, with the attainment of some or all of their advantages. Therefore, it is the object of the appended claims to cover all such variations and modifications as come within the true spirit and scope of the embodiments herein.

What is claimed is:

1. A system, comprising:
   an engine having an exhaust manifold outlet;
   an exhaust pipe having an inlet and an outlet;
   a thermoelectric generator (TEG) insert having a housing that encloses TEG elements coupled to an interior portion of the housing that is disposed between the exhaust manifold outlet of the engine and the inlet of the exhaust pipe and is configured to convert heat from exhaust gas leaving the engine into electrical power, wherein the housing of the TEG insert includes:
   a first sidewall and a second sidewall parallel to one another and are disposed in a perpendicular manner to a flow of the exhaust gas,
   an outside wall that extends in a perpendicular direction and thereby connects a perimeter of the first sidewall to a perimeter of the second sidewall via the outside wall and forms the exterior of the housing in conjunction with the first sidewall and the second sidewall, and
   an extension wall that traverses the interior portion of the housing, connects the first sidewall to the second sidewall, extends in a direction perpendicular to the first sidewall and the second sidewall and define a plurality of cut-out portions through which the exhaust gas flows, and the first and second sidewalls, the extension walls and the outside wall form a hollow chamber through which the coolant flows.

2. A system, comprising:
   an engine having an exhaust manifold outlet;
   an exhaust pipe having an inlet and an outlet; and
   a thermoelectric generator (TEG) insert that is disposed between the exhaust manifold outlet of the engine and the inlet of the exhaust pipe wherein the exhaust manifold outlet is coupled to an inlet of the TEG insert and an outlet of the TEG inert is coupled to the inlet of the exhaust pipe, and is configured to convert heat from exhaust gas leaving the engine into electrical power, wherein the TEG insert includes:
   a housing that encloses TEG elements coupled to an interior portion of the housing, a first sidewall having an interior surface and a second sidewall having an interior surface wherein the interior surface of the first side wall is adjacent to an interior surface of the second sidewall and the first sidewall and the second side wall are positioned parallel to one another, an outside wall that extends in a perpendicular direction between a perimeter of the first sidewall to a perimeter of the second sidewall and forms an exterior of the housing in conjunction with the first sidewall and the second sidewall, and an extension wall that traverses the interior portion of the housing, connects the first sidewall to the second sidewall, and extends in a direction perpendicular to the first sidewall and the second sidewall, and wherein one or more TEG elements are mounted on the interior surface of the outside wall.

3. The system according to claim 2, wherein the TEG insert is located adjacent to the exhaust manifold outlet.

4. The system according to claim 3, wherein the TEG insert is removably attached to the engine.

5. The system according to claim 2, wherein the interior portion of the housing includes a hollow chamber.

6. The system according to claim 5, wherein the TEG insert further includes an inlet and an outlet that are formed on the housing and configured to allow coolant to pass through the hollow chamber of the housing.

7. The system according to claim 5, wherein the TEG elements are positioned such that they are heated by the exhaust gas leaving the engine.

8. The system according to claim 7, wherein the TEG elements are heated more on a first side of the TEG elements than on a second side of the TEG elements.

9. The system according to claim 7, wherein the TEG elements are positioned such that they are cooled by coolant passing through the hollow chamber of the housing.

10. The system according to claim 2, wherein the housing of the TEG insert includes a cut-out portion that traverses a width of the TEG insert.

11. The system according to claim 10, wherein the TEG insert is positioned such that the cut-out portion is operable to receive the exhaust gas leaving the engine.

12. The system according to claim 2, wherein one or more TEG elements are mounted on the interior surface of the first sidewall and the interior surface of the second sidewall.

13. The system according to claim 2, wherein one or more TEG elements are mounted on the interior surface of the extension wall.

14. The system according to claim 2, wherein a contact area of one of the TEG elements is in a range of 0.5 mm$^2$ to 10 mm$^2$.

15. The system according to claim 2, wherein the TEG elements are made of a silicon-based nanostructure.

\* \* \* \* \*